United States Patent [19]

Sexton

[11] Patent Number: 5,331,236
[45] Date of Patent: Jul. 19, 1994

[54] MICRODYNAMIC DEVICES FABRICATED ON SILICON-ON-SAPPHIRE SUBSTRATES

[75] Inventor: Douglas A. Sexton, San Diego, Calif.

[73] Assignee: The United States of America as represented by the Secretary of the Navy, Washington, D.C.

[21] Appl. No.: 932,430

[22] Filed: Aug. 19, 1992

[51] Int. Cl.$^5$ .................. H02N 1/00; H02K 15/00
[52] U.S. Cl. .................. 310/40 MM; 310/42; 310/309; 29/596; 29/598
[58] Field of Search .................. 310/40 MM, 42, 309; 29/596

[56] References Cited

U.S. PATENT DOCUMENTS

| | | | |
|---|---|---|---|
| 4,579,750 | 4/1986 | Bowen et al. | 427/53.1 |
| 4,754,185 | 6/1988 | Gabriel et al. | 310/309 |
| 4,893,509 | 1/1990 | MacIver et al. | 73/517 AV |
| 4,895,500 | 1/1990 | Hok et al. | 417/566 |
| 5,013,954 | 5/1991 | Shibaike et al. | 310/309 |
| 5,043,043 | 8/1991 | Howe et al. | 156/645 |
| 5,072,288 | 12/1991 | MacDonald et al. | 310/309 X |
| 5,093,594 | 3/1992 | Mehregany | 310/82 |
| 5,095,401 | 3/1992 | Zavracky et al. | 361/283 |
| 5,101,256 | 3/1992 | Harame et al. | 257/567 |
| 5,177,595 | 1/1993 | Beatty | 257/727 |
| 5,206,983 | 5/1993 | Guckel et al. | 29/598 |

OTHER PUBLICATIONS

Muller, R. S., et al., eds., *Microsensors*, IEEE Electron Devices Society, ISBN 0-87942-245-9, 1990.
Muller, R. S. "Microdynamics", *Sensors and Actuators*, 1990, 1-8; International Conference on Solid-State Sensors and Actuators (Transducers '89) and Eurosensors III, Montreaux, Switzerland, Jun. 25-30, 1989, A21-A23.
Tai, Y., & Muller, R. S. "IC-processed Electrostastic Synchronous Motors", *Sensors and Actuators*, 20, 1989, 49-55.
Wise, K. D., "Integrated Microelectromechanical Systems: A Perspective on MEMS in the 90s", *Proceedings*, 4th IEEE Micro Electro Mechanical Systems Workshop, Nara, Japan, Jan. 30-Feb. 2, 1991, 33-38.
Yun, W., et al. "Fabrication Technologies for Integrated Microdynamic Systems", Integrated Micro Motion Systems-Micromachining, Control, and Applications, ed. F. Harashima, Amsterdam: Elsevier Science Publishers, 1990, pp. 297-312; Proceedings of the Third Toyota Conference, Nissin, Aichi, Japan, Oct. 11-15, 1989.

*Primary Examiner*—Steven L. Stephan
*Assistant Examiner*—Judson H. Jones
*Attorney, Agent, or Firm*—Harvey Fendelman; Thomas Glenn Keough

[57] ABSTRACT

Silicon-on-sapphire substrates are provided for the fabrication of micromechanical devices, such as micromotors. The high voltage stand-off characteristics of silicon-on-sapphire thereby provides for the construction of superior electrostatically driven devices and sensors capable of being driven at significantly higher applied potentials since silicon-on-sapphire has demonstrated a capability for building in the range of hundreds of Angstroms, or thick, in the range of microns very high speed, low power, very densely packed integrated circuits using standard silicon processing techniques. As a consequence, the electrostatically driven devices, micromotors, can be incorporated in the integrated circuits and yet be powered at elevated voltages to increase their work potential.

7 Claims, 2 Drawing Sheets

MICRODYNAMIC DEVICES FABRICATED ON SILICON-ON-SAPPHIRE SUBSTRATES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Methods developed for the fabrication of integrated circuits (I.C.) are now being applied to the production of microdynamic structures, see for example, the host of sensors and fabrication techniques disclosed in "Microsensors," edited by R. S. Muller et al., *IEEE Electron Devices Society*, 1990, ISBN 0-87942-245-9. In addition to these structures and fabrication techniques a great variety of moving micromechanical devices, such as electrostatically driven resonant bridges, motors, tweezers, and actuators are well established in the state of the art, as described in the two publications "Microdynamics," Sensors and Actuators, by R. S. Muller, A2-1–A23, 1–8 (1990), *5th International Conference on Solid-State Sensors and Actuators (Transducers '89) and Eurosensors III*, Montreux, Switzerland, Jun. 25–30, 1989; and "Integrated Microelectromechanical Systems: A Perspective on MEMS in the '90s" by K. D. Wise, *4th IEEE Micro Electro Mechanical Systems Workshop*, Nara, Japan, Jan. 30–Feb. 2, 1991, pp. 33–38.

To date, the substrate of choice for most of the contemporary fabrications has been single crystal silicon. This selection most likely has been made to permit the application of well developed silicon microfabrication techniques and, more importantly, to allow the integration of microdynamic structures and integrated circuits onto the same substrate. In this regard the article by W. Yun, W. C. Tang, and R. T. Howe, "Fabrication Technologies for Integrated Microdynamic Systems", *Integrated Micro Motion Systems—Micromachining, Control, and Applications*, edited by F. Harashima, Amsterdam: Elsevier Science Publishers, 1990, pp. 297–312; Proceedings of the Third Toyota Conference, Nissin, Aichi, Japan, Oct. 11–15, 1989, shows that the current state of the art provides for the sensing, computing, and actuating being done on the same chip.

The materials used in the construction of a typical micromechanical device include a single crystal substrate, a sacrificial oxide, deposited polysilicon and/or tungsten, and perhaps silicon nitride or other dielectrics and conductors. However, the use of silicon substrates restricts the magnitude of the voltages which may be applied to the electrostatic components.

Thus, a continuing need exists in the state of the art for the application of silicon-on-sapphire substrates in the fabrication of a micromotor devices to allow the application of higher voltages to the micromotors to enhance their performance.

SUMMARY OF THE INVENTION

The present invention is directed to providing an improvement for micromotor devices fabricated in accordance with integrated circuitry techniques on a silicon-on-sapphire substrate to allow the application of higher voltages to the micromotors to enhance their performance in the fabrication of micromechanical devices.

An object of the invention is to provide an improvement for microdynamic components fabricated on a silicon-on-sapphire substrate.

Another object is to provide an improvement for the integration of microdynamic components and electronic components on a silicon-on-sapphire substrate.

Another object is to provide for the integration of microdynamic components, high speed, low power control electronics and power supplies onto a single silicon-on-sapphire substrate.

Another object is to provide an improved fabrication procedure for microdynamic components built in the range of hundreds of Angstroms, or thick, in the range of microns on a silicon-on-sapphire substrate as compared to silicon substrates.

Yet another object is to provide for an improved microdynamic component capable of being driven at higher potentials by being fabricated on a silicon-on-sapphire substrate.

These and other objects of the invention will become more readily apparent from the ensuing specification when taken in conjunction with the drawings and the appended claims.

BRIEF DESCRIPTION OF THE DRAWINGS

FIGS. 1a through 1g depict a typical fabrication procedure for at least one micromotor on a silicon-on-sapphire substrate in accordance with this inventive concept, it being understood that a multitude of such could be fabricated in conjunction with other integrated circuit components to more completely realize the advantages associated with mass production techniques.

DESCRIPTION OF THE PREFERRED EMBODIMENTS

This invention provides for the utilization of silicon-on-sapphire (SOS) substrates in micromachined applications to allow a very forthright transfer of the processing parameters developed for device fabrication on conventional silicon to the new substrate. The use of conventional silicon substrates restricts the magnitude of the voltages which may be applied to the electrostatic components to less than 1000 volts. The magnitude of the voltage applied to these conventional structures can be dramatically increased beyond 1000 volts to over 3000 volts by using silicon-on-sapphire (SOS) substrates. SOS has been used to build very high speed, low power, very densely packed I.C.s using standard silicon processing. Therefore, electrostatically driven devices could be powered at elevated voltages increasing their work potential. Because the circuits and microstructures will be fabricated on insulating substrates, they can hold off much higher voltages than comparable devices in silicon. In addition, the environments in which many microelectromechanical devices are to be applied require high temperature operation (e.g. car engines). SOS technologies have a demonstrated performance superiority to bulk silicon devices in high temperature applications.

The construction of devices such as electrostatic micromotors would follow essentially the same standard steps as on bulk silicon except that the dielectric isolation deposition procedure set out in the above cited article by Y. Tai et al. is not required.

Figure 1A:
Figure 1B:
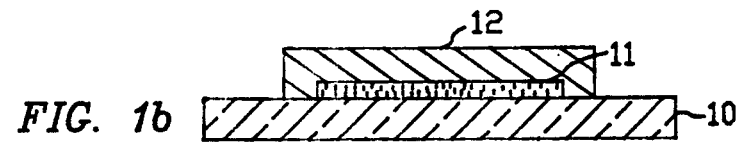
Figure 1C:
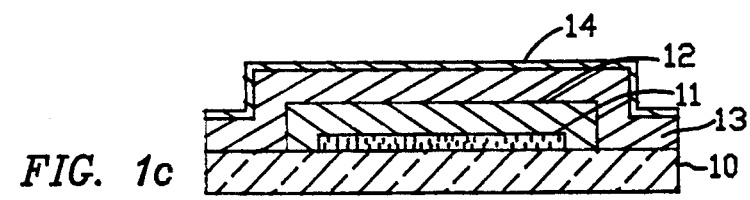
Figure 1D:
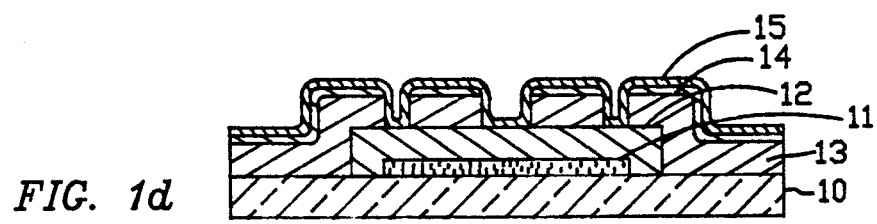
Figure 1E:
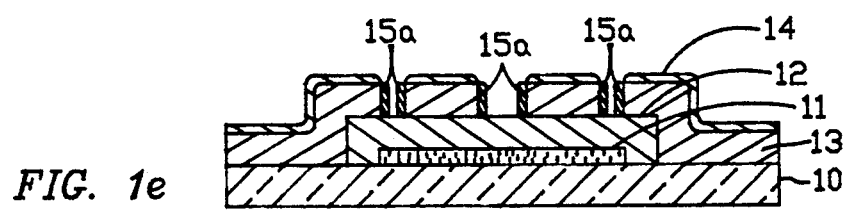
Figure 1F:
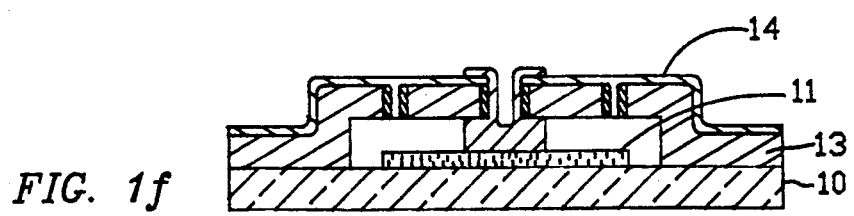
Figure 2:
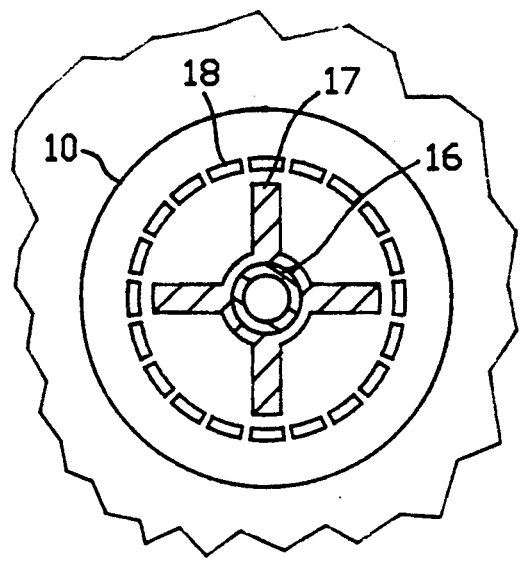
FIG. 2 shows a schematically depicted micromotor on a silicon-on-sapphire substrate.

An example of the procedure that might be selected for the fabrication of a micromotor on SOS is depicted in FIGS. 1a through 1f to produce the schematically depicted micromotor of FIG. 2. FIG. 1a has a sapphire substrate 10 provided with a silicon island 11. The silicon island may be suitably deposited on the sapphire substrate to form a ground plane that is covered with phosphosilicate glass (PSG) layer 12. The phosphosilicate glass layer is used to function as a sacrificial layer, see FIG. 1b. A polysilicon layer 13 is deposited on phosphosilicate glass layer 12 to form the rotor and stator of the micrometer being fabricated and an appropriate thermal oxide layer 14 is deposited in accordance with accepted techniques to cover the polysilicon layer, note FIG. 1c. Thermal oxide layer 14 is patterned appropriately and the polysilicon layer is etched down in accordance with accepted techniques to the PSG to shape portions of the micromotor being fabricated and to allow the growing of a silicon nitride layer 15 on the shaped portions, see FIG. 1d.

Reactive ion etching of the silicon nitride layer removes parts of the silicon nitride layer to leave nitride spacers 15a such as depicted in FIG. 1e. A hub is formed by etching phosphosilicate glass layer 12, undercutting the polysilicon layer 13, depositing more PSG and polysilicon by low pressure chemical vapor deposition (LPCVD), and then appropriately patterning the newly deposited PSG and polysilicon in accordance with well established fabrication procedures to create a hub 16, rotor 17 and stator 18, see the hub, rotor and stator on a ground plane of silicon on sapphire 10 as shown from above in FIG. 1g.

The resulting motor would have superior performance due to the ability of the insulating substrate to hold off high voltages. For example, in a rotating motor the torque exerted by an electric field can be expressed in terms of the derivative of the stored electrical co-energy. The co-energy equals $\frac{1}{2} CV^2$, where C represents the capacitance cross the driving electrodes that have a voltage V across them. The rotor torque T per phase can be expressed as the derivative of the co-energy with respect to the rotor angle $\theta$:

$$T(\theta) = 1/2 V^2 \frac{\partial C(\theta)}{\partial \theta}$$

The torque generated by a rotating motor therefore increases as a function of the square of the voltage between the rotor and the stator. The SOS substrate will allow superior dielectric isolation of the electrodes, not shown, permitting the application of higher voltages yielding larger torques. In addition, the SOS substrates may permit the fabrication of high voltage drive circuitry on the chip.

This application of the constituents of a micromotor on a silicon-on-sapphire substrate allows the fabrication of this and other micromachined devices to have a superior performance. Furthermore, this fabrication technique permits the integration of microdynamic components, high speed, lower power control electronics and power supplies onto a single substrate, in this case, silicon-on-sapphire. By reason of the selection of the silicon-on-sapphire substrate some fabrication steps necessary in the microfabrication of electrostatic motors on bulk silicon substrates are eliminated when building the same devices on SOS. For example, on a conventional silicon substrate a composite layer of 300 nm dioxide and 1 um of silicon nitride otherwise has been needed to be grown atop the conventional silicon substrate to prevent breakdown between the motor and the substrate. The silicon nitride is required to prevent etching of the underlying silicon dioxide while removing the sacrificial oxide layer. Since substrate shorting is eliminated by using SOS, these last two steps are not required with SOS.

The application of SOS materials to microdynamic technologies can be extended to many structures beyond the scope of motors, tweezers, etc. The crystal quality of the SOS can be improved by ion implantation and solid phase epitaxial regrowth or alternative deposition techniques, it can be made very thin, in the range of hundreds of Angstroms, or thick, in the range of microns, depending on the applications. The structures could include sensors, actuators, signal processors, power supplies, etc. Other SOI technologies such as bonded wafers, SIMOX, etc., might could be used as alternative substrates.

Figure 3:
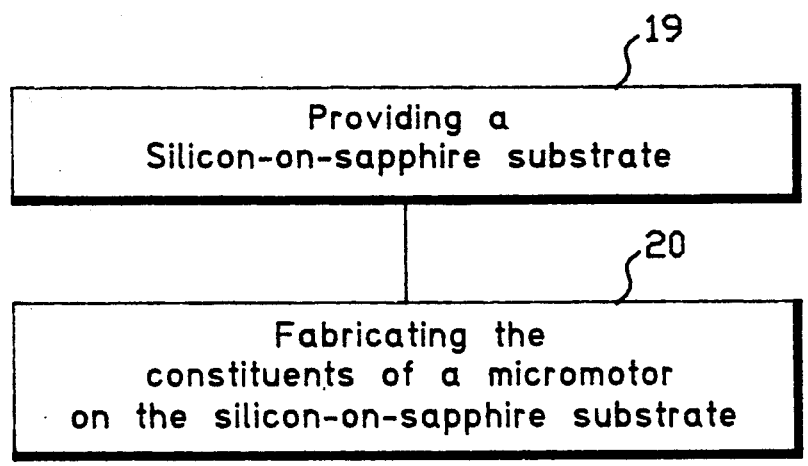
FIG. 3 is the method of fabrication of at least one micromotor on a silicon-on-sapphire substrate in accordance with this inventive concept.

The method of fabricated an improved micromotor to provide a capability for being driven at higher potentials than silicon substrate components is set out in FIG. 3. Providing 19 a silicon-on-sapphire substrate allows the fabricating 20 of the constituents of a micromotor thereon. The method also includes the providing of the silicon-on-sapphire substrate in the range of hundreds of Angstroms, or thick, in the range of microns to permit driving the improved micromotor at potentials in excess of 1000 volts to at least 3000 volts.

Obviously, many modifications and variations of the present invention are possible in the light of the above teachings. It is therefore to be understood that within the scope of the appended claims, the invention may be practiced otherwise than as specifically described.

I claim:

1. An improved micromotor capable of being driven at increased driving potentials comprising:
   a silicon-on-sapphire substrate; and
   micromotor constituents fabricated on said silicon-on-sapphire substrate to assure said being driven at increased driving potentials.

2. An improved micromotor according to claim 1 in which said silicon-on-sapphire substrate is provided in a thickness in the range of hundreds of Angstroms, and, optionally, thicker, in the range of microns.

3. An improved micromotor according to claim 1 in which said micromotor constituents on said silicon-on-sapphire substrate can be driven at potentials of at least 3000 volts.

4. A method of fabricated an improved micromotor to provide a capability for being driven at higher potentials that silicon substrate components comprising:
   providing a silicon-on-sapphire substrate; and
   fabricating the constituents of a micromotor on said silicon-on-sapphire substrate.

5. A method of fabricated an improved micromotor according to claim 4 in which said providing of said silicon-on-sapphire substrate is in a thickness in the range of hundreds of Angstroms, and, optionally, thicker, in the range of microns.

6. A method according to claim 5 in which said providing of said silicon-on-sapphire substrate permits driving said improved micromotor at potentials in excess of 1000 volts.

7. A method according to claim 5 in which said providing of said silicon-on-sapphire substrate permits driving said improved micromotor at potentials of at least 3000 volts.

* * * * *